Patented Aug. 3, 1926.

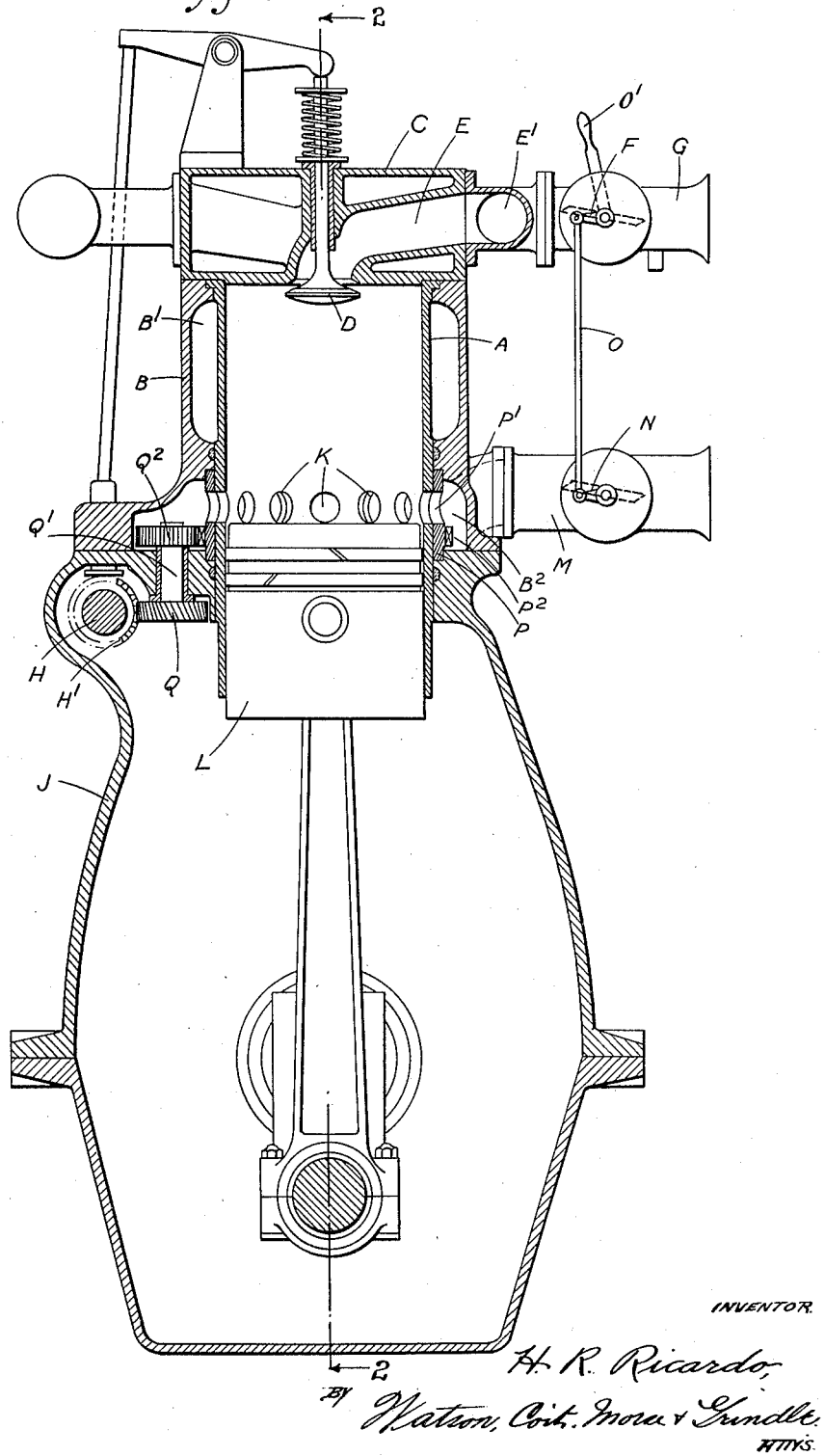

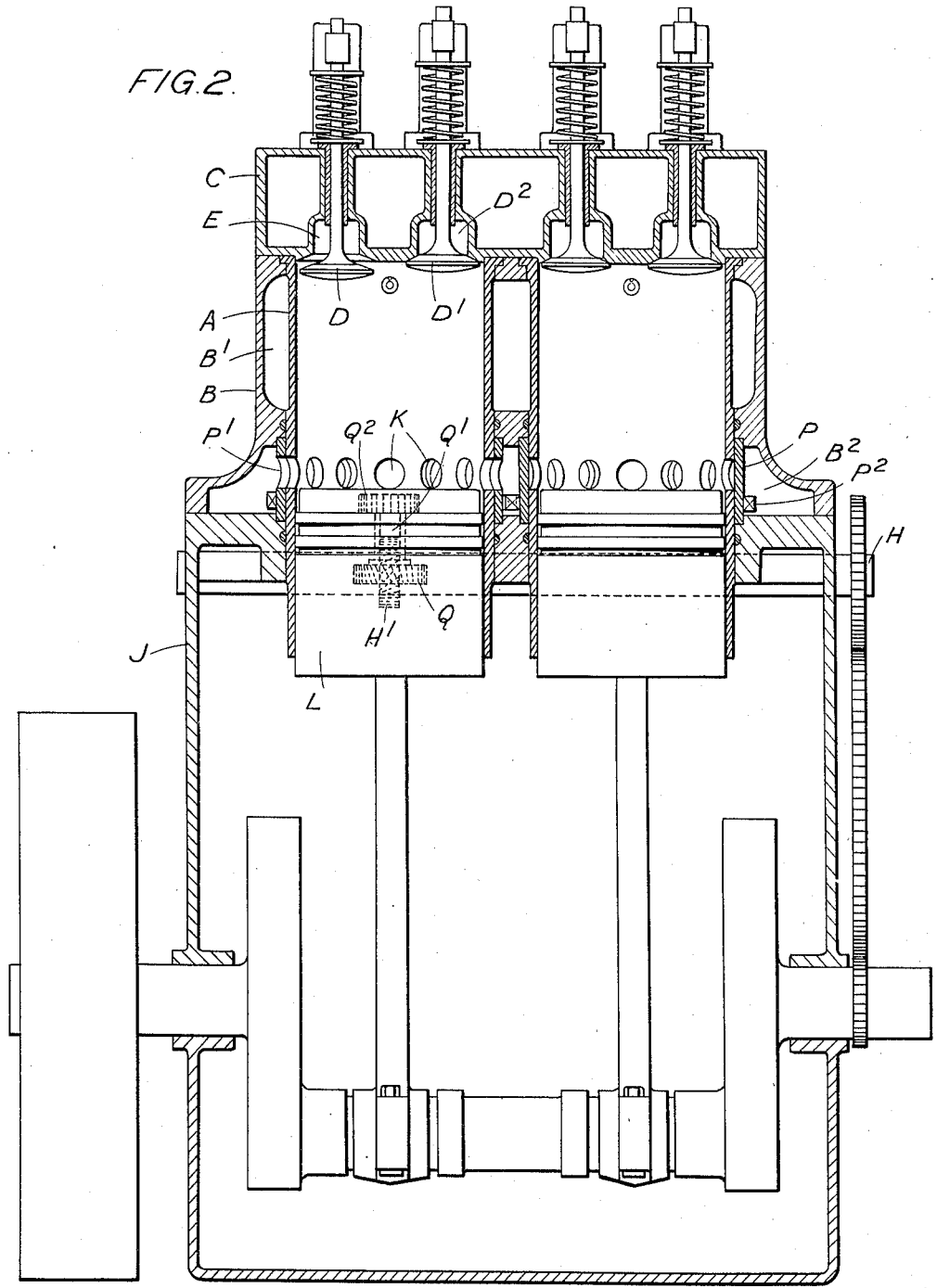

1,594,755

UNITED STATES PATENT OFFICE.

HARRY RALPH RICARDO, OF LONDON, ENGLAND.

INTERNAL-COMBUSTION ENGINE.

Application filed July 7, 1924, Serial No. 724,705, and in Great Britain July 13, 1923.

This invention relates to internal combustion engines operating on the four-stroke cycle and of the type having ports in the wall of the cylinder which when uncovered by the piston serve to admit a supplementary charge of air after the introduction of the main charge and has for its object to modify an engine of this type so as to make it possible to use fuel mixtures of weak mean strength more especially in engines employed on motor road vehicles where the load on the engines is frequently varied.

It is well known both from theoretical considerations and from practical results that as the mixture strength of the charge in an internal combustion engine is reduced the thermal efficiency is increased and the heat flow generally is considerably reduced, the latter effect having a beneficial influence on the general reliability and durability of the engine and more particularly on those parts which are most influenced by the heat flow such, for example, as the exhaust valves and the sparking plugs. With all fuels normally used in the engines of motor road vehicles, it is not possible to use a homogeneous mixture more than about 20% weak as the rate of burning of the weaker mixtures is too low while in a multi-cylinder engine distribution errors reduces this figure about 5% so that the advantages indicated above cannot be realized in practice in an engine of normal construction.

According to this invention poppet valves are provided to control normal inlet and exhaust ports in the head of the cylinder and a sleeve is arranged to be movable over ports formed in the wall of the cylinder where they will be simultaneously uncovered by the piston at or near the end of its outstroke, this sleeve being actuated so as to close these ports during the expansion stroke and thereby prevent the escape of exhaust gases through them but to open the ports for the admission of air with or without an admixture of gas preferably inert gas from the atmosphere or from a blower at or near the end of the suction stroke, the admission of the main and supplementary charges being so timed and respectively determined as to result in stratification of the whole charge contained in the cylinder at the end of the suction stroke. For controlling the flow of air to the ports, separate means are provided which may be actuated in conjunction with or in relation to the control of the main charge admission. Thus when the engine is running the charge is admitted to the cylinder in two portions, namely, a comparatively rich charge which enters through the ordinary inlet valve or valves in the normal manner and a supplementary charge which is admitted to the cylinder towards the end of the outstroke of the piston this supplementary charge forming a layer above the piston. The main charge is easily ignited in the usual manner and the consequent turbulence thoroughly mixes the two charges so that the expanding mixture has a comparatively low temperature and exhibits all the properties of a very weak mixture. The supplementary charge is caused to enter the cylinder either by the depression existing in the cylinder at the end of the induction stroke or by the delivery of the supplementary charge under pressure. The ports in the wall of the cylinder are controlled by a movable sleeve which surrounds the cylinder and operates as a valve this valve being actuated by suitable mechanism so as to close and open the ports during the desired periods. The sleeve valve is conveniently arranged to be rotatable on the cylinder and rotation is imparted thereto through some convenient form of gearing from the camshaft which actuates the valves controlling the inlet and exhaust ports at the head of the cylinder. A passage leads to the ports from the atmosphere or from a blower or the like for delivering the supplementary charge under pressure this passage terminating conveniently at its inner end in an annular chamber which surrounds the ports and the sleeve valve controlling them. A throttle valve is disposed in this inlet passage and a connection is provided to this throttle valve so as to enable it to be actuated preferably in conjunction with or in fixed relation to the movement of the throttle controlling the admission of the main charge a linkage or the like being employed for this purpose.

An advantage of this improved method of operation is that owing to the supplementary air charge and the manner in which it is introduced it becomes possible to burn efficiently a considerable excess of fuel in the main charge so that any errors in distribution or carburation will not affect appreciably the efficiency of the engine. This is of importance in the case of multi-cylinder engines where distribution errors may be considerable. The manner in which the supplementary charge is controlled by its throttle in relation to the amount of main charge admitted makes it possible to avoid the entry into the cylinder of an excessive supply of air at very light loads. The throttle controlling the supplementary charge may be actuated directly by the operator but, as mentioned, is preferably controlled by interconnection with the main engine throttle or the control may be automatic as for example by means of a diaphragm or the like subjected to the action of the induction pipe depression.

In most cases the supplementary charge comprises air only and is drawn direct from the atmosphere by the depression existing in the cylinder when the ports in the wall of the cylinder are open and uncovered by the piston. Thus at full load when the main charge is unthrottled, very little supplementary air enters and combines with the excess fuel in the main charge which is preferably somewhat rich so that the full power output of which the cylinder is capable may be obtained. As the main charge is throttled, an increasing amount of supplementary air is drawn in and by reducing the flame temperature increases the thermal efficiency of the engine and gives relief to heat stressed parts such as the exhaust valves. If the main charge is considerably throttled, the amount of supplementary air drawn in if unrestricted would be excessive and would dilute unduly the main charge. The throttle controlling the supplementary air is therefore preferably adjusted so as to come into operation at a certain stage of the throttling of the main charge and thereafter progressively reduces the amount of supplementary air admitted.

In certain cases, more particularly where the invention is applied to engines for aeronautical work, the supplementary charge may be supplied under super-atmospheric pressure by means of a blower or other convenient mechanism, the main charge being drawn in at atmospheric pressure in the usual manner. In this case it is desirable to arrange for the main inlet valve or valves to be closed before the opening of the ports through which the supplementary charge enters so as to prevent the main charge from being driven back through the inlet valve by the supplementary charge.

The invention may be carried out in various ways but one construction according to this invention which may be adopted in case of a multi-cylinder engine is illustrated in the accompanying drawings, in which:—

Fig. 1 is a section taken through one of the cylinders in a plane at right angles to the crank shaft axis; and Fig. 2 is a section on the line 2—2 of Figure 1.

Each cylinder comprises a liner A constituting the cylinder proper these liners being pressed into a cylinder jacket block B. A detachable water-jacketed head C carries the inlet and exhaust valves and has the inlet and exhaust passages formed therein. The drawings illustrate a poppet valve D controlling the inlet passage E which leads from the induction manifold E' the throttle F and carburettor G being shown somewhat diagrammatically and an exhaust valve D' controlling exhaust passage $D^2$. The valves are actuated by overhead gear and push rods from a camshaft H suitably disposed at the side of the upper part of the crank case J.

In the wall of the cylinder A are a series of ports K positioned where they will be uncovered by the piston L at or about the end of its outstroke. The water jacket B' stops short of the ports K and in the cylinder block D around these ports is formed an annular chamber $B^2$ these chambers surrounding the several cylinders being in open communication. A passage M in which is disposed a throttle N leads into the intercommunicating chambers $B^2$. This throttle is connected by a link O to the main throttle F.

The exterior of the cylinder A in the neighbourhood of the ports K is machined and on it is mounted a sleeve P in which are ports P' adapted to coincide with the ports K. The sleeve P constitutes a valve controlling the ports K and is rotatable on the cylinder A. Each sleeve is provided with a toothed annulus $P^2$ and these teeth mesh with the corresponding teeth on the sleeve valve of the next adjacent cylinder or cylinders so that all the sleeve valves P controlling the ports K of the several cylinders will rotate simultaneously. Rotation is imparted to all the sleeves by gearing from the camshaft H this gearing comprising, for example, as shown, a skew gear wheel H' on the camshaft H meshing with a simliar wheel Q mounted on one end of a short vertically disposed shaft Q' on the other end of which is a toothed wheel $Q^2$ meshing with the toothed ring $P^2$ of one of the sleeves P. The rotation of the sleeves P is so timed that the ports K will be closed at the time when they are uncovered by the piston L at the end of the expansion stroke and preferably also while the piston is at or near the end of its instroke when the skirt of the piston uncovers the ports K to the interior of the crank case J. The ports K will be open, however, at the end of the suction stroke.

It is desirable not to bring the throttle N controlling the inflow of air to the chamber B² and ports K into effective operation until the main throttle F is partially closed. This may be effected mechanically by means of suitable interconnection gear or, more simply, by coupling the throttles as by the link O while making the opening controlled by the throttle valve N of such size that, while the throttle is fully opened it will allow a free flow for a volume of air, with or without a small admixture of active or inert gas in excess of that which can flow through the passage M. The first portion of the closing movement of the valve N will then not appreciably effect the air flow to the subsidiary ports. The throttle valves are conveniently controlled by a lever O', as shown somewhat diagrammatically in Figure 1 of the drawings.

The carburettor G is preferably adjusted so as to give a somewhat rich mixture for the main charge, say from 10% to 15% rich at all loads. This will give the maximum power at full throttle and a good margin at all loads for acceleration and distribution while the supplementary air entering through the passage M will burn efficiently the surplus fuel at the lighter loads which form by far the greater part of the duty of the engine of a motor road vehicle.

The improved construction is applicable to engines wherein kerosene or similar fuels are used and in which exhaust or other inert gases are added to the charge in a known manner in order to check detonation. In engines of a type known heretofore with a homogeneous charge the addition of such inert gases while checking detonation tends to reduce the available range of mixture strength and thus necessitates the use of a richer mixture. In a multi-cylinder engine the charge must generally be somewhat richer in any case to allow for errors in carburation and distribution so that the addition of inert gases involves a further enriching which largely nullifies the gain in efficiency due to the permissible increase in compression ratio.

By applying the present invention to such an engine, the supplementary charge entering through the ports K is capable of efficiently burning a considerable excess of fuel in the main charge. Thus the latter may contain a considerable proportion of inert gases and yet be efficiently burnt while the permissible compression ratio is correspondingly increased. The inert gas may be supplied with the main charge in some known manner such for example as that described in the specification of the present inventor's Letters Patent of the United States of America No. 1,342,869. Though the inert gas is added preferably to the main charge, it may be added to the supplementary charge entering through the passage M or to both charges.

What I claim as my invention and desire to secure by Letters Patent is:—

1. In an internal combustion engine operating on the four stroke cycle the combination of a cylinder, a cylinder head, a piston working within the cylinder, a poppet valve controlling an inlet port through which a normal mixture is adapted to be drawn and an exhaust port, said ports being situated in the cylinder head, a sleeve surrounding and movable on the cylinder and controlling a number of ports situated around the cylinder where they will be uncovered substantially simultaneously by the piston towards the end of its out-stroke and through which a relatively weak mixture is adapted to be drawn to form a stratum over said piston, and means for operating the sleeve valve so that it will close the ports controlled thereby at the end of the expansion stroke and open them at the end of the suction stroke to admit a supplementary charge.

2. In an internal combustion engine operating on the four stroke cycle, the combination of a cylinder, a cylinder head, a piston working in said cylinder, a poppet valve controlling an inlet port through which a normal mixture is adapted to be drawn, and an exhaust port, said ports being arranged in the cylinder head, a sleeve surrounding and movable on the cylinder and controlling a number of ports situated around the cylinder where they will be uncovered substantially simultaneously by the piston towards the end of its outstroke, a chamber communicating with the last mentioned ports, an inlet passage communicating with the chamber, a manually operable throttle valve in the passage and means for operating the sleeve valve so that it will close the ports controlled thereby at the end of the expansion stroke and open them at the end of the suction stroke to admit a supplementary charge.

3. In an internal combustion engine operating on the four stroke cycle, the combination of a cylinder, a cylinder head, a piston working in said cylinder, a poppet valve controlling an inlet port through which a normal mixture is adapted to be drawn, and an exhaust port, said ports being arranged in the cylinder head, a sleeve surrounding and movable on the cylinder and controlling a number of ports situated around the cylinder where they will be uncovered substantially simultaneously by the piston towards the end of its out-stroke, a chamber communicating with the last mentioned ports, an inlet passage communicating with the chamber, a throttle valve controlling said passage, a second throttle valve controlling the inlet port for said normal mixture, an operative connection between said throttle valves and means for operating the sleeve valve so that it will close the ports controlled thereby at the end of the expansion stroke and open them at the end of the suction stroke to admit a supplementary charge.

4. In an internal combustion engine operating on the four-stroke cycle the combination of a cylinder, a cylinder head, a piston working within the cylinder, poppet valves controlling inlet and exhaust ports in the cylinder head, a ported sleeve surrounding and rotatable on the cylinder and controlling ports therein situated where they will be uncovered simultaneously by the piston at the end of its outstroke and means for rotating the sleeve so that it will close the ports controlled thereby at the end of the expansion stroke and open them at the end of the suction stroke to admit a supplementary charge of a combustible mixture weaker than that admitted through the inlet poppet valve, said mixture forming a stratum on said piston.

5. In an internal combustion engine operating on the four-stroke cycle the combination of a cylinder, a cylinder head, a piston working within the cylinder, poppet valves controlling inlet and exhaust ports in the cylinder head, a sleeve surrounding and movable on the cylinder and controlling ports therein situated where they will be uncovered substantially simultaneously by the piston towards the end of its outstroke and means for operating the poppet valves and also the sleeve valve so that the latter will close all of the ports controlled thereby at the end of the expansion stroke and open all of them at the end of the suction stroke to admit a supplementary charge thereby bringing about stratification of the whole charge in the cylinder at the end of the suction stroke.

6. In an internal combustion engine operating on the four-stroke cycle the combination of a cylinder, a cylinder head, a piston working within the cylinder, poppet valves controlling inlet and exhaust ports in the cylinder head, a sleeve surrounding and movable on the cylinder and controlling ports therein situated where they will be uncovered substantially simultaneously by the piston towards the end of its outstroke, a chamber communicating with these ports, an inlet passage communicating with the chamber, a manually operated throttle valve in this passage and means for operating the poppet valves and also the sleeve valve so that the latter will close the ports controlled thereby at the end of the expansion stroke and open them at the end of the suction stroke to admit a supplementary charge thereby bringing about stratification of the whole charge in the cylinder at the end of the suction stroke.

7. In an internal combustion engine operating on the four-stroke cycle the combination of a cylinder, a cylinder head, a piston working in the cylinder, poppet valves controlling inlet and exhaust ports in the cylinder head, a sleeve surrounding and movable on the cylinder and controlling ports therein situated where they will be uncovered substantially simultaneously by the piston towards the end of its outstroke, a chamber communicating with these ports, an inlet passage communicating with this chamber, a throttle valve controlling this passage, a second throttle valve controlling the flow of gas to the inlet port in the cylinder head, an operative connection between these two throttle valves and means for operating the poppet valves and also the sleeve valve so that the latter will close the ports controlled thereby at the end of the expansion stroke and open them at the end of the suction stroke to admit a supplementary charge thereby bringing about stratification of the whole charge in the cylinder at the end of the suction stroke.

8. In an internal combustion engine operating on the four-stroke cycle the combination of a cylinder, a cylinder head, a piston working within the cylinder, poppet valves controlling inlet and exhaust ports in the cylinder head, a ported sleeve surrounding and rotatable on the cylinder and controlling a ring of ports situated so as to be uncovered simultaneously by the piston at the end of its outstroke, an annular chamber surrounding these ports, an inlet passage communicating with this chamber, a throttle valve in this passage, a second throttle valve controlling the flow of gas to the inlet port in the cylinder head, an operative connection between these two throttle valves and means for rotating the sleeve valve so that it will close the ports controlled thereby at the end of the expansion stroke and open them at the end of the suction stroke to admit a supplementary charge.

9. In an internal combustion engine operating on the four-stroke cycle the combination of a cylinder, a cylinder head a piston working within the cylinder, poppet valves controlling inlet and exhaust ports in the cylinder head, a ported sleeve surrounding and rotatable on the cylinder and controlling a ring of ports situated so as to be uncovered simultaneously by the piston at the end of its outstroke, an annular chamber surrounding these ports, an inlet passage communicating with this chamber, a throttle valve in this passage, a second throttle valve controlling the flow of gas to the inlet port in the cylinder head, an operative connection between these two throttle valves and means for operating the poppet valves and also the sleeve valve so that the latter will close the ports controlled thereby at the end of the expansion stroke and open them at the end of the suction stroke to admit a supplementary charge thereby bringing about stratification of the whole charge in the cylinder at the end of the suction stroke.

In testimony whereof I have signed my name to this specification.

HARRY RALPH RICARDO.